United States Patent
Kwon et al.

(10) Patent No.: US 8,986,904 B2
(45) Date of Patent: Mar. 24, 2015

(54) SOLID OXIDE FUEL CELL AND MANUFACTURING METHOD THEREOF

(75) Inventors: Young-Sun Kwon, Yongin-si (KR); Sang-Jun Kong, Yongin-si (KR); Hyun Soh, Yongin-si (KR); Kwang-Jin Park, Yongin-si (KR); Gyu-Jong Bae, Yongin-si (KR); Duk-Hyoung Yoon, Yongin-si (KR); Tae-Ho Kwon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/607,634

(22) Filed: Sep. 7, 2012

(65) Prior Publication Data

US 2013/0224630 A1   Aug. 29, 2013

(30) Foreign Application Priority Data

Feb. 23, 2012   (KR) .................. 10-2012-0018446

(51) Int. Cl.
*H01M 2/08* (2006.01)
*H01M 8/02* (2006.01)
*H01M 8/04* (2006.01)
*H01M 8/00* (2006.01)

(52) U.S. Cl.
CPC ........ *H01M 8/0282* (2013.01); *H01M 8/04201* (2013.01); *H01M 8/004* (2013.01); *Y02E 60/525* (2013.01)
USPC .............. 429/509; 156/60; 156/293; 429/508

(58) Field of Classification Search
CPC .............. H01M 8/004; H01M 8/0282; H01M 8/04201; Y02E 60/50; Y02E 60/525
USPC ...................... 429/508, 509, 510; 156/60, 293
See application file for complete search history.

(56) References Cited

U.S. PATENT DOCUMENTS

| | | | | |
|---|---|---|---|---|
| 5,279,909 | A | * | 1/1994 | Horner et al. ................. 429/184 |
| 2006/0172141 | A1 | * | 8/2006 | Huang et al. ................. 428/469 |
| 2007/0231660 | A1 | * | 10/2007 | Song et al. ..................... 429/35 |
| 2009/0197135 | A1 | | 8/2009 | Querel et al. |

FOREIGN PATENT DOCUMENTS

| | | |
|---|---|---|
| JP | 2011-519113 | 6/2011 |
| KR | 10-0400434 | 9/2003 |
| KR | 10-2008-0008019 | 1/2008 |

* cited by examiner

*Primary Examiner* — Nicholas P D'Aniello
(74) *Attorney, Agent, or Firm* — Christie, Parker & Hale, LLP

(57) ABSTRACT

A solid oxide fuel cell and a manufacturing method thereof includes a unit cell and a cell coupling member. The unit cell includes a first electrode layer, an electrolyte layer surrounding an outer peripheral surface of the first electrode layer, and a second electrode layer surrounding the electrolyte layer so that one end portion of the electrolyte layer is exposed. The cell coupling member is coupled to the unit cell and includes a coupling member. A sealing member including at least two layers having different porosities is coated on at least one portion of the coupling member to seal the unit cell and the cell coupling member.

10 Claims, 5 Drawing Sheets

SOLID OXIDE FUEL CELL AND MANUFACTURING METHOD THEREOF

RELATED APPLICATIONS

This application claims priority to and the benefit of Korean Patent Application No. 10-2012-0018446, filed in the Korean Intellectual Property Office on Feb. 23, 2012, the entire content of which is incorporated herein by reference.

BACKGROUND

1. Field

An aspect of the present invention relates to a fuel cell and a manufacturing method thereof.

2. Description of the Related Art

Fuel cells are a high-efficiency, clean generation technology for directly converting hydrogen and oxygen into electric energy through an electrochemical reaction. Here, the hydrogen is contained in a hydrocarbon-based material such as natural gas, coal gas, or methanol, and the oxygen is contained in the air. Such fuel cells are classified into alkaline fuel cells, phosphoric acid fuel cells, molten carbonate fuel cells, solid oxide fuel cells, and polymer electrolyte membrane fuel cells, depending on the type of electrolyte used.

Among these fuel cells, the solid oxide fuel cell is a fuel cell operated at a high temperature of about 600 to 1000° C. Solid oxide fuel cells are widely used because the position of the electrolyte is relatively easily controlled, there is little or no concern about the exhaustion of fuel, and the lifetime of the material is long, compared with various types of conventional fuel cells.

In solid oxide fuel cells, the inside and outside of a unit cell are different electrodes from each other, and therefore, different kinds of fuels are supplied to the electrodes, respectively. When a leak occurs in a sealing portion due to the lack of sealing between the unit cell and a cell coupling member, the temperature of the cell is increased by mixing and igniting both the fuels at a high temperature, and accordingly, the deterioration of the cell is accelerated. Therefore, the durability of the solid oxide fuel cell may be reduced.

SUMMARY

Aspects of embodiments of the present invention provide a solid oxide fuel cell and a manufacturing method thereof, in which a multi-layered sealing member, different layers having different porosities, is formed between a cell coupling member and a unit cell, so that the cell coupling member and the unit cell can be closely sealed.

According to an embodiment of the present invention, a solid oxide fuel cell includes a unit cell, a cell coupling member, and a sealing member. The unit cell includes a first electrode layer, an electrolyte layer surrounding an outer peripheral surface of the first electrode layer, and a second electrode layer surrounding the electrolyte layer so that one end portion of the electrolyte layer is exposed. The cell coupling member includes a coupling member, and the cell coupling member is coupled to the unit cell. The sealing member is on at least one portion of the coupling member, and the sealing member includes at least two layers having different porosities, and the sealing member is configured to seal the cell coupling member and the unit cell.

The sealing member may include a first sealing member and a second sealing member, and the porosity of the first sealing member may be greater than that of the second sealing member. The porosity of the first sealing member may be 10% to 25%. The porosity of the second sealing member may be greater than 0% to 15%. The viscosity of the second sealing member, prior to drying, may be greater than that of the first sealing member, prior to drying. The viscosity of the second sealing member, prior to drying, may be 10% or more than that of the first sealing member.

The sealing member may include a ceramic material.

The cell coupling member may include a flow path tube inserted into the unit cell that is configured to form a flow path from the inside of the unit cell to the outside of the unit cell. The coupling member of the cell coupling member may include a first coupling member at an outside of the flow path tube and a second coupling member connected to the first coupling member. The first coupling member may be configured to receive the end portion of the unit cell between the second coupling member and the flow path tube, and the second coupling member may define the insertion depth of the electrolyte layer and the first electrode layer into the cell coupling member.

The sealing member may include a first sealing member and a second sealing member, and the first sealing member may be on a surface of the first coupling member to seal a gap between the end portion of the unit cell and the first coupling member. The second sealing member may be on an inner circumferential surface of the second coupling member to seal a gap between a side portion of the unit cell and the second coupling member.

According to an embodiment of the present invention, a manufacturing method of a solid oxide fuel cell includes providing a unit cell, providing a cell coupling member, and sealing the unit cell and the cell coupling member. The providing a unit cell includes providing a unit cell having a first electrode layer, an electrolyte layer surrounding an outer peripheral surface of the first electrode layer, and a second electrode layer surrounding the electrolyte layer so that one end portion of the electrolyte layer is exposed. The providing a cell coupling member includes providing a cell coupling member including a coupling member. The sealing the unit cell and the cell coupling member includes sealing the unit cell and the cell coupling member by coating a sealing member, having at least two layers having different porosities, on at least one portion of the coupling member and drying the sealing member.

The providing the cell coupling member may include providing a cell coupling member including a flow path tube. The coupling member may include a first coupling member and a second coupling member, the first coupling member being at an outside of the flow path tube and configured to receive the end portion of the unit cell between the second coupling member and the flow path tube, and the second coupling member defining the insertion depth of the electrolyte layer and the first electrode layer into the cell coupling member. The sealing the cell coupling member to the unit cell may include inserting the flow path tube into the inside of the unit cell to form a flow path from the inside to the outside of the unit cell.

The sealing member may include a first sealing member and a second sealing member. The first sealing member may be coated on a surface of the first coupling member and then pressed and dried to seal a gap between the end portion of the unit cell and the first coupling member. The second sealing member may be coated on an inner circumferential surface of the second coupling member and then pressed and dried to seal a gap between a side portion of the unit cell and the second coupling member.

The porosity of the second sealing member may be less than that of the first sealing member. The porosity of the first sealing member may be 10% to 25%. The porosity of the second sealing member may be greater than 0% to 15%. The second sealing member may be formed by being pressed and dried at room temperature.

BRIEF DESCRIPTION OF THE DRAWINGS

The accompanying drawings, together with the specification, illustrate exemplary embodiments of the present invention, and, together with the description, explain principles of embodiments of the present invention.

DETAILED DESCRIPTION

Figure 1:
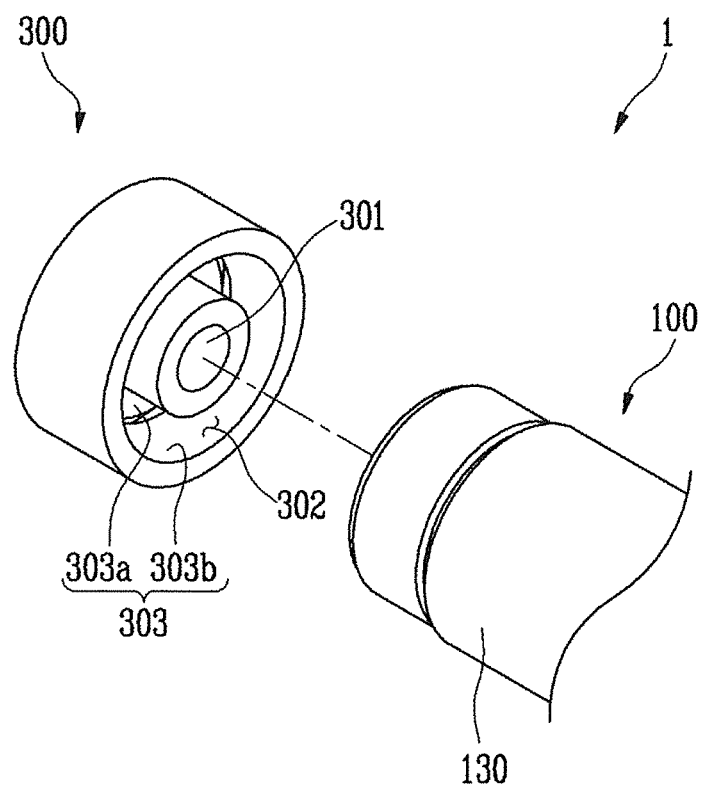
FIG. 1 is a partial perspective view showing a unit cell and a cell coupling member according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In addition, when an element is referred to as being "on" another element, it may be directly on the another element or may be indirectly on the another element with one or more intervening elements interposed therebetween. Also, when an element is referred to as being "connected to" another element, it may be directly connected (or coupled) to the another element or be indirectly connected (or coupled) to the another element with one or more intervening elements interposed therebetween.

Hereinafter, like reference numerals refer to like elements. In the drawings, the thickness or size of layers may be exaggerated for clarity and are not necessarily drawn to scale.

Figure 2:
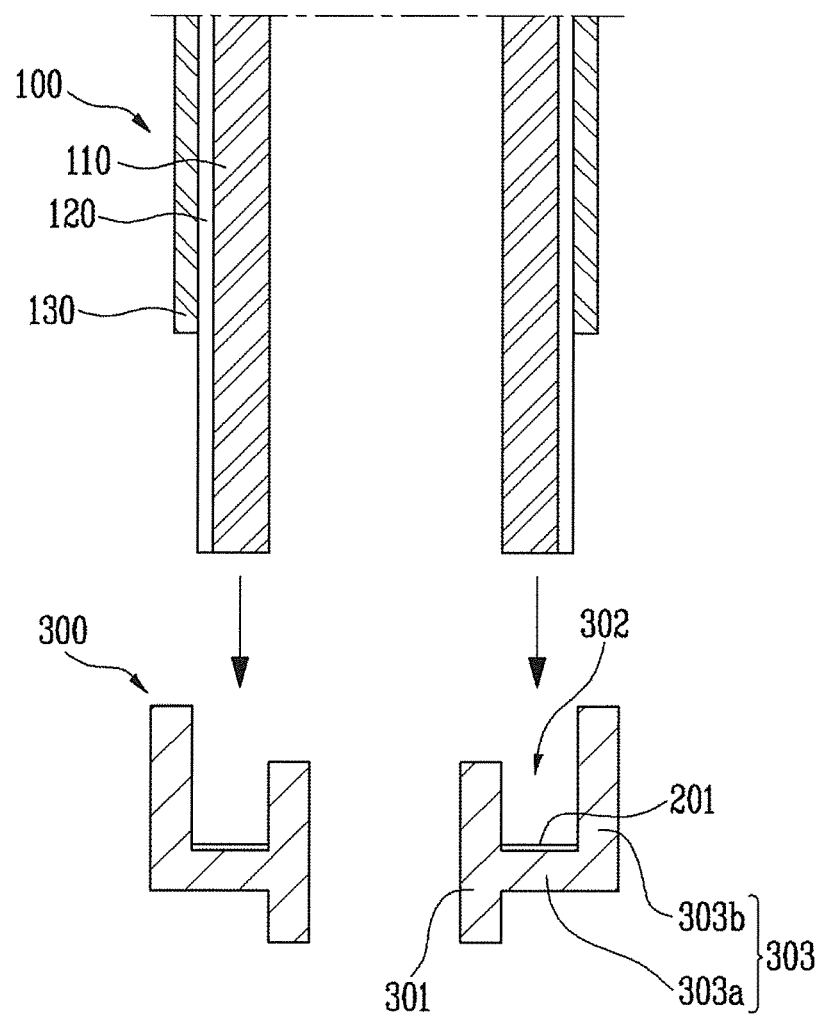
FIG. 2 is a cross-sectional view showing the unit cell and the cell coupling member according to one embodiment of the present invention.
Figure 3:
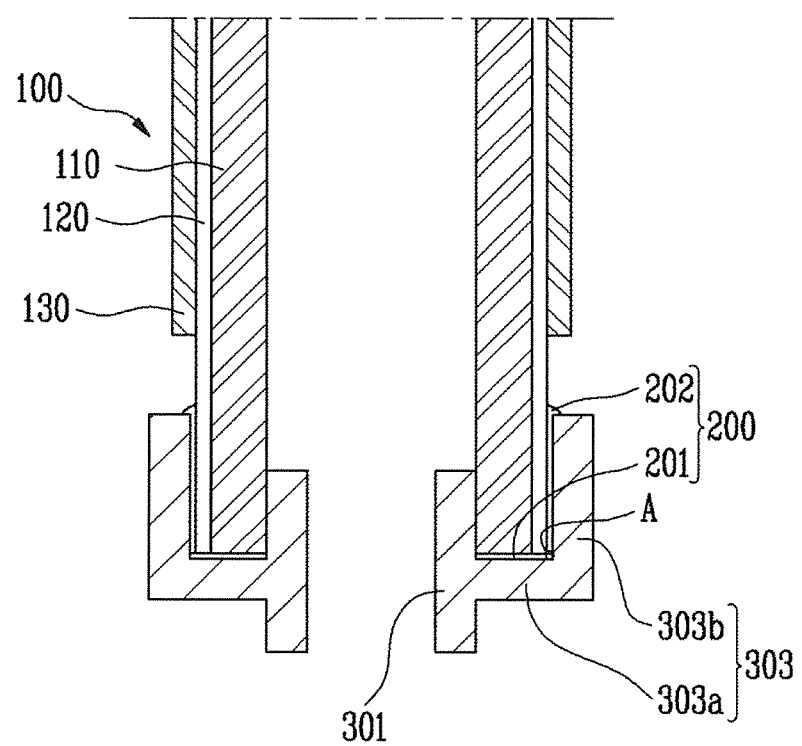
FIG. 3 is a cross-sectional view showing the unit cell and the cell coupling member coupled to each other according to one embodiment of the present invention.
Figure 4:
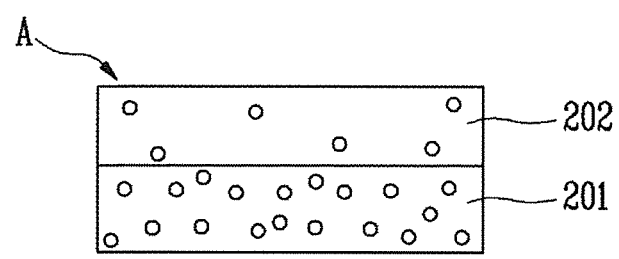
FIG. 4 is an enlarged view showing portion A of FIG. 3.
Figure 5A:
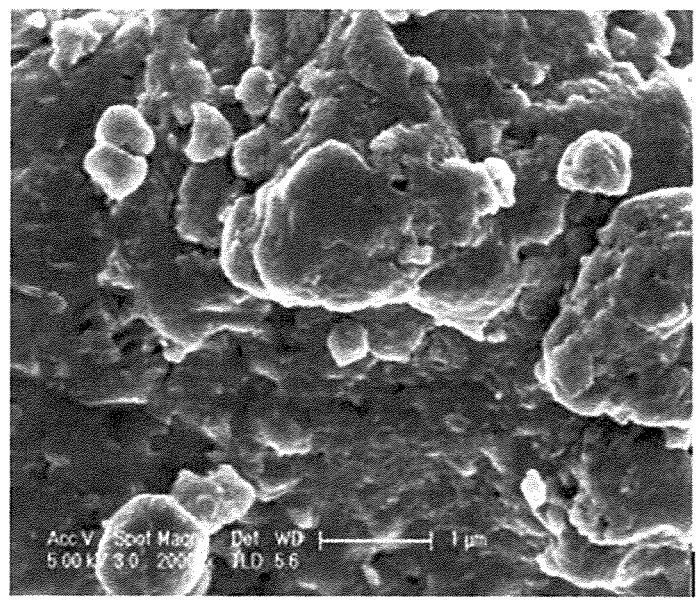
FIGS. 5A and 5B are scanning electron microscope (SEM) photographs respectively showing first and second sealing members constituting a double-layered sealing member according to the embodiment of the present invention.
Figure 5B:
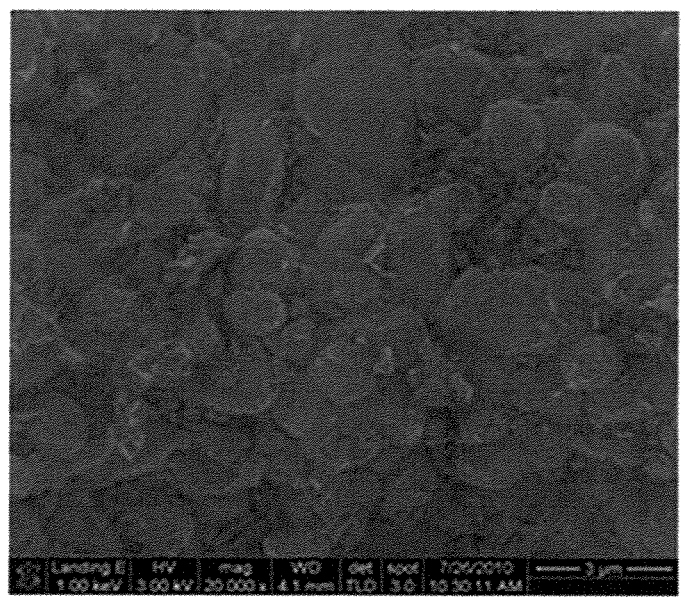

FIG. 1 is a partial perspective view showing a unit cell and a cell coupling member according to an embodiment of the present invention. FIG. 2 is a cross-sectional view showing the unit cell and the cell coupling member according to one embodiment of the present invention. FIG. 3 is a cross-sectional view showing the unit cell and the cell coupling member coupled to each other according to one embodiment of the present invention. FIG. 4 is an enlarged view showing portion A of FIG. 3. FIGS. 5A and 5B are scanning electron microscope (SEM) photographs respectively showing first and second sealing members constituting a double-layered sealing member according to the embodiment of the present invention.

Referring to FIGS. 1 to 3, the solid oxide fuel cell 1 according to this embodiment includes a unit cell 100 and a cell coupling member 300. The unit cell 100 includes a first electrode layer 110, an electrolyte layer 120 surrounding the outer peripheral surface (e.g., the outer circumferential surface) of the first electrode layer 110, and a second electrode layer 130 surrounding the electrolyte layer 120 so that one end portion of the electrolyte layer 120 is exposed. That is, as shown in FIG. 2, the bottom end portion of the electrolyte layer 120 and the first electrode layer 110 extend beyond the bottom end portion of the second electrode layer 130. The cell coupling member 300 includes a coupling member 303, and is coupled to the unit cell 100. When the cell coupling member 300 is coupled to the unit cell 100, a flow path (e.g., a continuous flow path) from the inside to the outside of the unit cell 100 is formed. A sealing member composed of two or more (i.e., at least two) layers having different porosities is coated on at least one portion of the coupling member 303 so that the unit cell 100 and the cell coupling member 300 are sealed together. That is, the sealing member seals a joint between the unit cell 100 and the cell coupling member 300.

The unit cell 100 is formed in the shape of a cylinder that is hollow in the center. The unit cell 100 includes the first electrode layer 110, the electrolyte layer 120 and the second electrode layer 130, sequentially formed from the inside to the outside of the unit cell 100. Here, the electrolyte layer 120 is formed to surround the outer peripheral surface (e.g., the outer circumferential surface) of the first electrode layer 110, and the second electrode layer 130 is formed to surround the electrolyte layer 120 while exposing the one end portion of the electrolyte layer 120. According to the type of the fuel cell, the first electrode layer 110 may be an anode or a cathode, and the second electrode layer 130 may be the other of the cathode or the anode. In one embodiment, the first electrode layer 110 is an anode and the second electrode layer 130 is a cathode.

The cell coupling member 300 is configured to allow hydrogen gas and external air not to be mixed together (i.e., to maintain the separation of hydrogen gas and external air), and includes a flow path tube 301 and the coupling member 303. Here, the hydrogen gas and external air are respectively supplied to the inside and outside of the unit cell 100. One end of the flow path tube 301 is inserted into the unit cell 100 through an opening at the bottom end of the unit cell 100. The flow path tube 301 is connected to an internal space of the unit cell 100 so as to form a flow path, and functions to transfer fuel or air to or from the unit cell 100 to another component of the fuel cell. The coupling member 303 includes a first coupling member 303a serving as an accommodating or receiving portion 302 and a second coupling member 303b defining the depth that the electrolyte layer 120 and the first electrode layer 110 are inserted into the cell coupling member 300.

The first coupling member 303a has a diameter greater than that of the flow path tube 301 at the outside of the flow path tube 301 so as to form a space in which the end portion of the unit cell 100 is accommodated. The second coupling member 303b is connected to the first coupling member 303a to support the first coupling member 303a, and defines the insertion depth of the electrolyte layer 120 and the first electrode layer 110 when the unit cell 100 is inserted into the receiving portion 302. In one embodiment, the flow path tube 301, the first coupling member 303a and the second coupling member 303b are integrally formed so as to improve sealing performance, durability and the like.

The sealing member 200 composed of two or more layers having different porosities is coated on a portion of the coupling member 303 in the receiving portion 302 so that the unit cell 100 and the cell coupling member 300 are sealed together. The sealing member 200 may be made of a ceramic material. If the sealing member 200 is pressed and then dried or sintered, the unit cell 100 and the cell coupling member 300 can be sealed together. Specifically, a first sealing member 201 is formed on a surface of the first coupling member 303a so as to seal a gap between the end portion of the unit cell 100 and the first coupling member 303a, and a second sealing member 202 is formed on the inner circumferential surface of the second coupling member 303b so as to seal a gap between an outer side portion of the unit cell 100 and the second coupling member 303b.

Accordingly, as shown in FIG. 4, a double layer sealing member 200 composed of the first and second sealing members 201 and 202 is formed on a portion of the coupling member 303. According to this embodiment, the first sealing member 201 has a porosity greater than that of the second sealing member 202, and the first sealing member 201 has a porosity of 10% or more and 25% or less, and the second sealing member 202 has a porosity of more than 0% and 15% or less. As described above, the double layered sealing member 200 is formed by coating the second sealing member 202 (see FIG. 5B), having a porosity smaller than that of the first sealing member 201, on the first sealing member 201 (see FIG. 5A), having a porosity greater than that of the second sealing member 202, so that it is possible to reduce gas leakage in the inside of the unit cell 100. Meanwhile, the first sealing member 201 has a lower viscosity than the second sealing member 202 (prior to drying). For example, the first sealing member 201 may have a viscosity of 700 cp or more and 80000 cp or less prior to drying, and the second sealing member 202 may have a viscosity 10% greater than that of the first sealing member 201 prior to drying. Because the first sealing member 201 has a relatively low viscosity prior to drying, its workability is good. Because the second sealing member 201 has a relatively high viscosity prior to drying, its compactness (e.g., its density) is high. Accordingly, it is possible to reduce the gas leakage.

Figure 6:
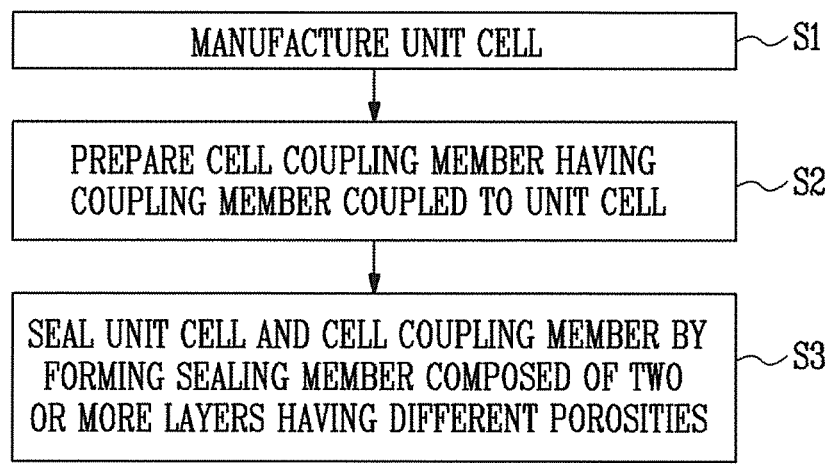
FIG. 6 is a flowchart illustrating a manufacturing method of a solid oxide fuel cell according to an embodiment of the present invention.

An embodiment of the present invention will be described with reference to Examples 1 and 2 and Comparative Examples 1 and 2, and FIG. 6, which is a flowchart illustrating a manufacturing method of a solid oxide fuel cell. The unit cells, cell coupling members, and sealing members of Examples 1 and 2 and Comparative Examples 1 and 2 were formed and assembled as follows.

First, a unit cell 100 is manufactured in the shape of a hollow cylinder (S1). The unit cell 100 includes a first electrode layer 110, an electrolyte layer 120 and a second electrode layer 130, sequentially formed from the inside to the outside of the unit cell 100. Here, the electrolyte layer 120 is formed to surround the outer circumferential surface of the first electrode layer 110, and the second electrode layer 130 is formed to surround the electrolyte layer 120 while exposing an end portion of the electrolyte layer 120.

Next, a cell coupling member 300 is prepared (S2). The cell coupling member 300 includes a flow path tube 301 and a coupling member 303, which are integrally formed. The flow path tube 301 is connected to an internal space of the unit cell 100 so as to form a flow path, and transfer fuel or air to another component of the unit cell 100. The coupling member 303 includes a first coupling member 303a forming a receiving portion 302 and a second coupling member 303b defining the insertion depth of the electrolyte layer 120 and the first electrode layer 110.

Finally, the unit cell 100 and the cell coupling member 300 are sealed by forming a sealing member 200 composed of two or more layers, having different porosities, on at least one portion of the coupling member 303 (S3).

The sealing of the unit cell 100 and the cell coupling member 300 using the sealing member 200 (S3) will be described in detail with reference to FIGS. 2 to 4.

First, as shown in FIG. 2, the first sealing member 201 is coated on the surface of the first coupling member 303a. Next, the one end portion of the unit cell 100 is mounted in the accommodating or receiving portion 302 of the cell coupling member 300, and the one end portion of the unit cell 100 and the cell coupling member 300 are then coupled by pressing and drying the first sealing member 201 at a normal temperature (e.g., room temperature or about 20 to 25° C.) for 24 hours. For example, the first sealing member 201 may be completely dried in terms of durability. Because the first sealing member 201 has a relatively low viscosity of about 20000 cp, its workability is good. Next, as shown in FIG. 3, the second sealing member 202 is coated on the inner circumferential surface of the second coupling member 303b, and the side portion of the unit cell 100 and the cell coupling member 300 are then coupled by pressing and drying the second sealing member 202 at a normal temperature (e.g., room temperature) for 4 hours. Finally, the first and second sealing members 201 and 202 are further dried by sintering the unit cell 100 coupled to the cell coupling member 300 at 300° C. for 2 hours. Accordingly, the solid oxide fuel cell 1 is completed. According to the configuration described above, the second sealing member 202 fills a gap (e.g., a fine gap) between the one end portion of the unit cell 100 and the cell coupling member 300 so that the solid oxide fuel cell 1 can be tightly sealed. As shown in FIG. 4, the double-layered sealing member 200 composed of the first and second sealing members 201 and 202 is formed on at least one portion of the coupling member 303.

Each of Examples 1-2 and Comparative Examples 1-2 included different sealing members. As described in Table 1, the first sealing member 201 according to Example 1 and the first sealing member 201 according to Example 2 had porosities of 24.2% and 20.5%, respectively. The second sealing member 202 according to Example 1 and the second sealing member 202 according to Example 2 had porosities of 13.1% and 2.9%, respectively. The sealing members according to Comparative Examples 1 and 2 were formed as single layers having porosities of 21.6% and 1.5%, respectively.

The gas leakage amount for the unit cell 100 of each of the Examples and Comparative Examples were measured. The method of measuring gas leakage amount will be briefly described. First, a tube of a gas leakage measuring device was connected to a portion at which the solid oxide fuel cell and a pipe are connected. The pipe is connected to the flow path tube. Next, the inside of the solid oxide fuel cell is vacuum-evacuated and then filled with helium (He) gas. When measuring the gas leakage amount, it is important to remove the helium gas from around the gas leakage measuring device so that the only gas detected is that leaked from the solid oxide fuel cell.

The measured results are described in Table 1. In the "Result" column, an "o" indicates that a seal was formed and there was relatively little leakage, while an "x" indicates that a seal was not formed and/or there was more significant leakage.

TABLE 1

| | Porosity (%) | | Gas leakage amount (L/ cm² · s · atm) | Result | Remarks |
|---|---|---|---|---|---|
| | First sealing member | Second sealing member | | | |
| Example 1 | 24.2 | 13.1 | $4.0 \times 10^{-6}$ | o | |
| Example 2 | 20.5 | 2.9 | $8.0 \times 10^{-8}$ | o | |
| Comparative Example 1 | 21.6 | — | $4.0 \times 10^{-4}$ | x | |
| Comparative Example 2 | 1.5 | — | $6.0 \times 10^{-5}$ | x | Fail to form sealing member |

As shown in Table 1, in Examples 1 and 2 in which the double-layered sealing member 200 was formed using the first and second sealing members 201 and 202, a small leakage amount was measured. Particularly, when the porosity of the second sealing member 202 was 2.9%, which is relatively low, a relatively small gas leakage amount was measured. On the other hand, in Comparative Examples 1 and 2 in which the single-layered sealing member was formed, a relatively larger gas leakage amount was measured compared to Embodiments 1 and 2. In Comparative Example 2, the sealing member was not formed due to poor workability.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A solid oxide fuel cell, comprising:
    a unit cell comprising a first electrode layer, an electrolyte layer surrounding an outer peripheral surface of the first electrode layer, and a second electrode layer surrounding the electrolyte layer so that one end portion of the electrolyte layer is exposed; and
    a cell coupling member coupled to the unit cell, the cell coupling member comprising a coupling member; and
    a sealing member on at least one portion of the coupling member, the sealing member comprising at least two layers having different porosities, the sealing member being configured to seal the cell coupling member and the unit cell,
        wherein each of the at least two layers having the different porosities contacts the electrolyte layer,
        the cell coupling member comprises a flow path tube inserted into the unit cell and configured to form a flow path from the inside of the unit cell to the outside of the unit cell, and the coupling member comprises a first coupling member at an outside of the flow path tube and a second coupling member connected to the first coupling member, the first coupling member being configured to receive an end portion of the unit cell between the second coupling member and the flow path tube and the second coupling member defining an insertion depth of the electrolyte layer and the first electrode layer into the cell coupling member, and
        the sealing member comprises a first sealing member and a second sealing member, and the first sealing member is on a surface of the first coupling member to seal a gap between the end portion of the unit cell and the first coupling member.

2. The solid oxide fuel cell according to claim 1, wherein a porosity of the first sealing member is greater than that of the second sealing member.

3. The solid oxide fuel cell according to claim 2, wherein the porosity of the first sealing member is 10% to 25%.

4. The solid oxide fuel cell according to claim 2, wherein the porosity of the second sealing member is greater than 0% to 15%.

5. The solid oxide fuel cell according to claim 2, wherein the viscosity of the second sealing member, prior to drying, is greater than that of the first sealing member, prior to drying.

6. The solid oxide fuel cell according to claim 5, wherein the viscosity of the second sealing member, prior to drying, is 10% or more than that of the first sealing member.

7. The solid oxide fuel cell according to claim 1, wherein the sealing member comprises a ceramic material.

8. The solid oxide fuel cell according to claim 1, wherein the second sealing member is on an inner circumferential surface of the second coupling member to seal a gap between a side portion of the unit cell and the second coupling member.

9. The solid oxide fuel cell according to claim 1, wherein the sealing member seals the cell coupling member at a bottom edge portion of the exposed end portion of the unit cell.

10. The solid oxide fuel cell according to claim 1, wherein the sealing member comprises a first sealing member on a surface of the first coupling member to seal a gap between the end portion of the unit cell and the first coupling member, and a second sealing member on an inner circumferential surface of the second coupling member to seal a gap between a side portion of the unit cell and the second coupling member.

* * * * *